United States Patent [19]

Takeuchi

[11] Patent Number: 4,641,158

[45] Date of Patent: Feb. 3, 1987

[54] ELECTROPHOTOGRAPHIC APPARATUS

[75] Inventor: Akihiko Takeuchi, Yokohama, Japan

[73] Assignee: Canon Kabushiki Kaisha, Tokyo, Japan

[21] Appl. No.: 699,185

[22] Filed: Feb. 7, 1985

[30] Foreign Application Priority Data

Feb. 13, 1984 [JP] Japan .................................. 59-24760
Feb. 13, 1984 [JP] Japan .................................. 59-24761
Feb. 13, 1984 [JP] Japan .................................. 59-24762

[51] Int. Cl.[4] .............................................. G01D 15/14
[52] U.S. Cl. .................................... 346/160; 346/108; 355/3 DR
[58] Field of Search ................ 346/160, 108; 358/300, 358/302; 355/3 P, 3 BE, 3 PR, 14 E; 400/119

[56] References Cited

U.S. PATENT DOCUMENTS 4,297,716 10/1981 Hikayama et al. .................. 346/160
4,375,067 2/1983 Kitamuka ............................ 346/160

*Primary Examiner*—Arthur G. Evans
*Attorney, Agent, or Firm*—Fitzpatrick, Cella, Harper & Scinto

[57] ABSTRACT

An electrophotographic photosensitive member including as a main component an amorphous silicon is exposed to a semiconductor laser beam having a wavelength longer than 700 nm, which has been modulated in accordance with the information to be recorded. After the exposure, the photosensitive member is exposed to a long wavelength light having the spectral distribution which has the peak at the wavelength of 600 nm.

26 Claims, 9 Drawing Figures

ELECTROPHOTOGRAPHIC APPARATUS

BACKGROUND OF THE INVENTION

The present invention relates to an electrophotographic apparatus wherein an electrophotographic photosensitive member is exposed to a laser beam modulated in accordance with information to be recorded, more particularly, to such an apparatus wherein a semiconductor laser and a photosensitive member containing, as a main content amorphous Si are used as the above laser and photosensitive member, respectively.

An electrophotographic photosensitive member containing as a main component CdS or amorphous Si does not have a sufficient sensitivity to the semiconductor laser beam having the wavelength larger than 700 nm.

Recently, a particular attention is directed to an electrophotographic photosensitive member containing as the main content amorphous Si. The amorphous Si has a sufficient sensitivity also to a long wavelength beam, such as a semiconductor laser beam. However, with repeated exposure thereof to the semiconductor laser beam of a long wavelength, a remarkable exposure hysteresis takes place in the amorphous Si, resulting in a deteriorated image record. More particularly, the recorded image involves, as a ghost image, the exposure hysteresis caused by the prior image information.

FIG. 1 shows an example of a spectral sensitivity of an amorphous Si, which almost all amorphous Si exhibit. FIG. 1 shows the relation between the wavelength of the exposure light and the amount of exposure required for decreasing the photosensitive member surface potetial from 400 V to a half thereof, that is, 200 V.

As will be understood from FIG. 1, with the wavelength longer than 760 nm, the photosensitivity becomes low. However, the amorphous Si photosensitive member still has a practically sufficient sensitivity to the semiconductor laser beam having the wavelength of 700 nm–800 nm.

FIG. 2 shows a test apparatus, to which the amorphous Si photosensitive member having the characteristics shown in FIG. 1 was incorporated. The photosensitive member in the form of a drum includes a conductive drum of aluminum and an amorphous Si layer having 20 microns thickness coated thereon, and is rotatable in the direction shown by an arrow at a peripheral speed of 200 mm/sec. Into the amorphous Si, a small amount of an impurity (hydrogen or nitrogen or the like) is doped. The photosensitive member 1 is first electrically charged to the positive polarity by a charger 2 supplied with 435 $\mu$A current. Then, it is exposed to a semiconductor laser beam 3 having 785 nm wavelength. The amount of exposure is 4 J/cm$^2$. The laser beam 3 is produced by a semiconductor laser LD and is focused as a spot on the photosensitive member 1 by a lens LS. The beam 3 is scanningly deflected in a direction substantially perpendicular to the rotation of the photosensitive member by a scanner SC, such as a polygonal mirror. The apparatus is equipped with a detector 4 for detecting the surface potential of the photosensitive member 1 and a discharger 5 for applying corona discharge of the negative polarity to the photosensitive member 1 to restore the surface potential of the photosensitive member 1 substantially to 0 V.

FIG. 3 shows the results of the test. During the first rotation of the photosensitive member 1, the semiconductor laser LD was kept off. By this rotation, the photosensitive member was charged by the charger 2 to 400 V ($a_1$) of the surface potential. Then, the photosensitive member 1 was continuously rotated for three turns with the semiconductor laser LD kept on to expose it to the beam 3. The surface potential of the photosensitive member 1 after the exposure to the laser beam 3 is indicated for each of the rotations by the references $b_2$, $b_3$ and $b_4$.

After the above 4 rotations of the photosensitive member, the semiconductor laser LD was kept off, again. Then, the surface potential of the photosensitive member 1, after subjected to the charger 2, changes with the rotation as shown by the references $c_5$, $c_6$, $c_7$ and $c_8$. The reference $c_5$ depicts approximately 350 V of the surface potential of the photosensitive member 1. In this specification, the difference in the surface potential of the photosensitive member between the point $a_1$ and the point $c_5$ is called "exposure hysteresis". In the device shown in FIG. 2, the exposure hysteresis of approximately 50 V is exhibited, which is large enough to produce a remarkable ghost image. On the other hand, a copying machine wherein an amorphous Si photosensitive member is exposed to image light through a lens, which image light is obtained by illuminating a document with a fluorescent lamp or a halogen lamp, does not practically involve a sufficient amount of the exposure hysteresis to be a problem. However, when a semiconductor laser beam having a long wavelength is used, the amorphous Si photosensitive member involves the strong exposure hysteresis. It is thought that this is because the semiconductor laser beam having the long wavelength can reach deep into the bulk of the amorphous silicon, and a large amount of the electric charge is captured in deep traps. It is considered that, with a short wavelength beam, such a phenomena rarely occurs.

SUMMARY OF THE INVENTION

Accordingly, it is a principal object of the present invention to provide an electrophotographic apparatus which can form a high quality image with the use of a long wavelength semiconductor laser beam and an amorphous Si photosensitive member to be exposed to such a beam.

It is another object of the present invention to provide an electrophotograpic apparatus which can provide an image without a "ghost", and which uses a semiconductor laser beam having a long wavelength and an amorphous silicon photosensitive member for being exposed to the beam.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

According to the present invention, the amorphous Si photosensitive member is exposed to light before it is subjected to the charging operation of the charger 2, so that it is electrically discharged. Such an exposure is called in this specification "pre-exposure".

Figure 4:
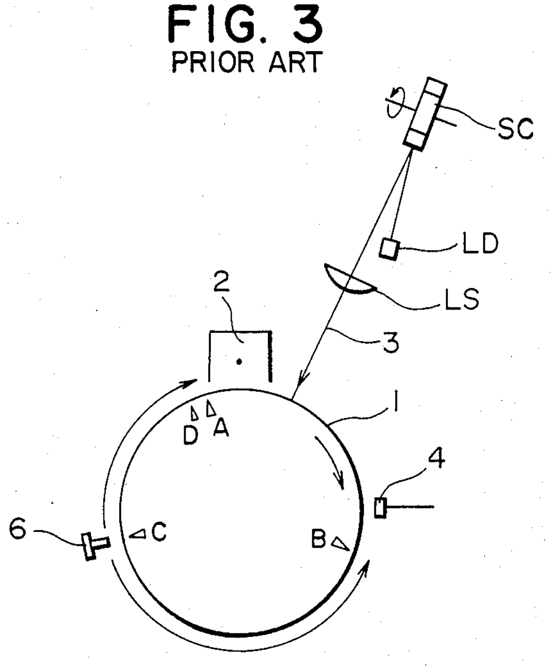
FIG. 4 is a cross-sectional view of an apparatus by which the effects of the present invention were confirmed.

Referring to FIG. 4, there is shown a test apparatus for confirming the effects of the present invention. The amorphous Si photosensitive member 1 is exposed at a point C to the light emitted by a light emitting diode (hereinafter also called "LED"). The amorphous Si photosensitive member 1 has a property of photosensitivity shown in FIG. 2. At a point indicated by reference A, the charger 2 starts to charge the amorphous Si photosensitive member. The time required for the photosensitive member 1 to move from the point C to the point A is 200 ms. The apparatus shown in FIG. 4 is different from that of FIG. 2 in that the amorphous Si photosensitive member 1 is electrically discharged by the light application prior to being subjected to the charger 2. Due to the pre-exposure, the dark resistance (the electric resistance of a photosensitive member in the dark) of the amorphous Si photosensitive member 1 decreases, so that the surface potential of the photosensitive member decreases even when it is placed in the dark. In order to charge the photosensitive member surface upto +400 V by the charger 2 under those conditions, the charger 2 was supplied with the current of 500 μA which is larger than in the case of FIG. 2. The strength of light emitted by LED 6, and therefore, the current applied to the LED 6 was so controlled that the photosensitive member surface is charged upto +400 V by the charger 2 supplied with 500 A current, during the first rotation of the photosensitive member 1.

The used light emitting diodes are the ones producing radiation having the principal wavelengths of 550 nm, 600 nm, 650 nm and 700 nm, the principal wavelength being the wavelength whose intensity of light is highest in the spectral distribution of the light, that is the peak wavelength. Generally, the spectral distribution of the radiation emitted by LED is substantially symmetrical with respect to the principal wavelength and is narrow so that the curvature is steep. For example, the spectral distribution providing the principal wavelength of 550 nm has a half-peak width of approximately 30 nm, the half-peak width being the width of the spectral distribution at the point having one half of the principal wavelength. The half peak width of the LED having the principal wavelength of 600 nm is approximately 30 nm; the 650 nm LED has the half-peak width of approximately 30 nm; and 700 nm LED has the half-peak width of approximately 100 nm. The rated current for the light emitting diodes having the principal wavelengths of 550 nm, 600 nm, 650 nm and 700 nm, are 20 mA, 20 mA, 20 mA and 5 mA, respectively.

Figure 1:
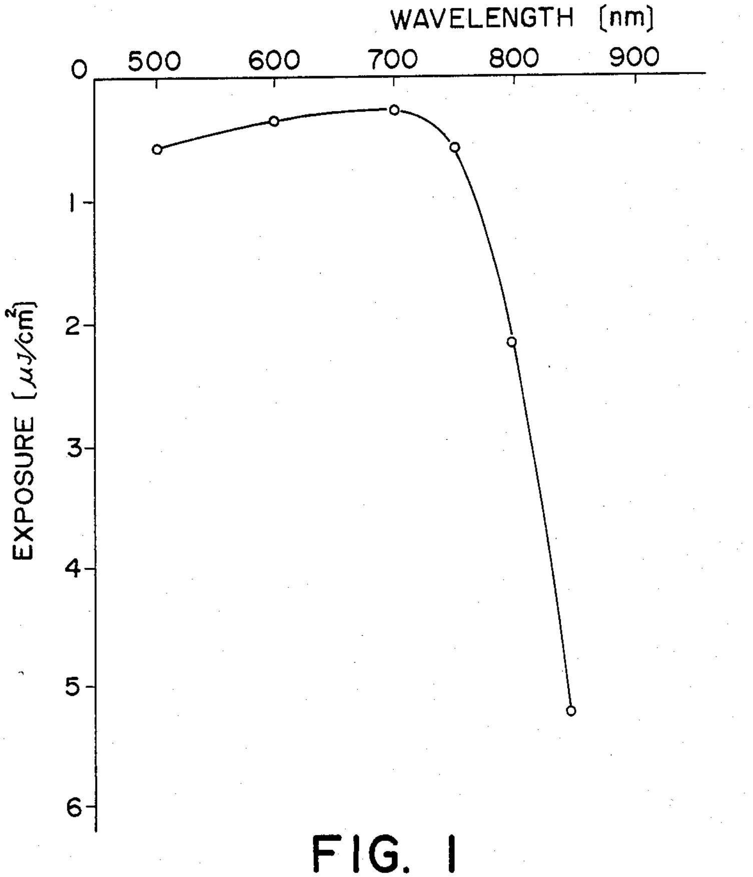
FIG. 1 PRIOR ART
FIG. 1 is a graph showing a spectral photosensitivity of an amorphous Si photosensitive member.
Figure 2:
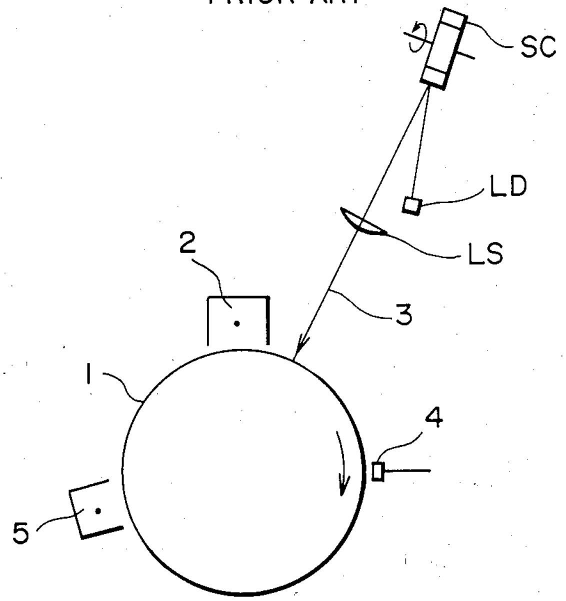
FIG. 2 PRIOR ART
FIG. 2 is a cross-sectional view of an apparatus by which an exposure hysteresis was measured.
Figure 3:
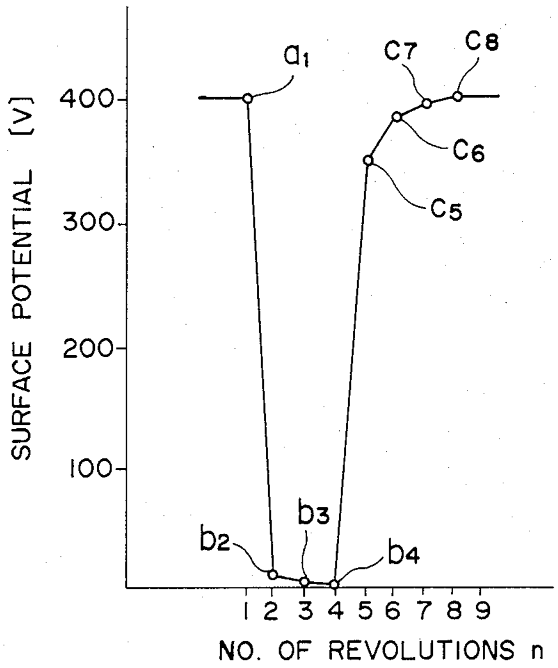
FIG. 3 PRIOR ART
FIG. 3 is a graph showing the exposure hysteresis provided by the apparatus of FIG. 2.
Figure 5:
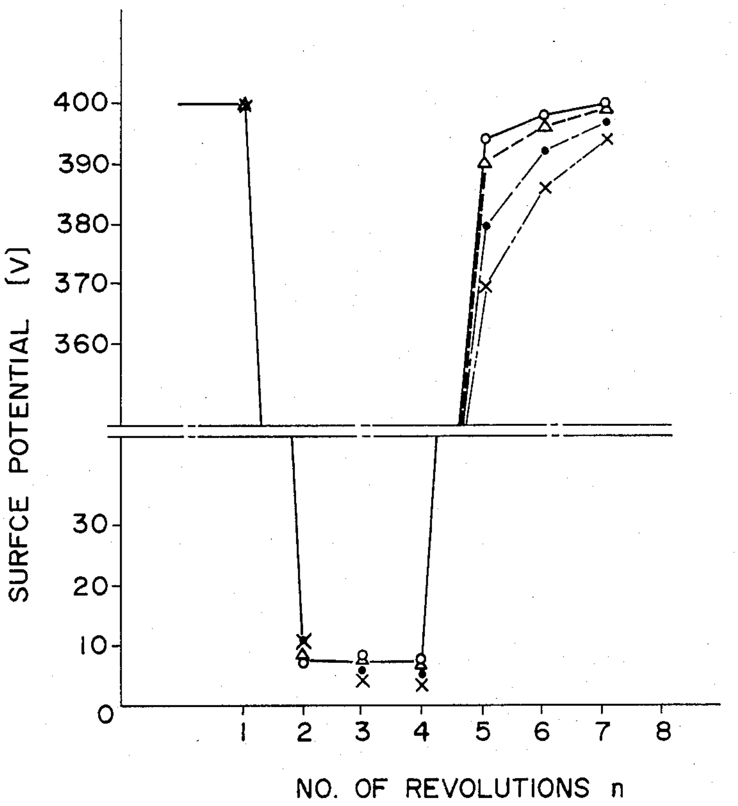
FIG. 5 illustrates the exposure hysteresis resulting in the apparatus shown in FIG. 4.

FIG. 5 and the following Table 1 show the results of the experiments, which have been carried out in the similar manner as in FIGS. 2 and 3. More particularly, the semiconductor laser LD was kept on during the second, thrid and fourth rotations of the photosensitive member (the amount of exposure is 4 $\mu J/cm^2$), while the semiconductor laser LD was kept off during the first rotation and the fifth and later rotations.

TABLE 1

| WAVE-LENGTH (nm) | CURRENT FOR LIGHT (mA) | CHARGING CURRENT (μA) | EVALUATION |
|---|---|---|---|
| 700 | 2 | 500 | GOOD |
| 650 | 15 | 500 | FAIRLY GOOD |
| 600 | 22 | 500 | TOLERABLE |
| 550 | 28 | 500 | NO |

When the light emitting diode having the principal wavelength of 700 nm or 600 nm provides only 10 V of the exposure hysteresis, with which there is no ghost image. However, the light emitting diode having 600 nm of the principal wavelength results in 20 V of the exposure hystresis. It is considered that this is the practical limit. With the light emitting diode having the principal wavelength of 550 nm, the exposure hysteresis was so large that a ghost appeared conspicuously on the resultant image. It is thought that this is because, as described hereinbefore, the exposure to the semiconductor laser beam 3 having a long wavelength results in quite a large amount of electric charge being captured by the deep traps in the bulk of the amorphous silicon. It is, therefore, considered that, by the pre-exposure with the short wavelength LAD having the principal wavelength of 550 nm, such a deep trap does not appear, so that a relatively great potential difference results during the charging by the charger 2 between the portion which has been exposed by the semiconductor laser beam and the portion not exposed thereto; however, when the pre-exposure is carried out with the light emitting diode producing a long wavelength light near the semiconductor laser beam, quite a large amount of the electric charge is captured by the deep traps at the portion of the photosensitive member which has not been exposed to the semiconductor laser beam, so that much smaller potential difference results during the charging operation by the charger 2.

However, with the increase of the wavelength of the pre-exposure light and with the increase of the light amount of the pre-exposure, the decrease of the dark resistance of the amorphous silicon photosensitive member becomes larger. Therefore, in order to obtain a high potential on the surface of the photosensitive member 1, it is required that the current applied to the charger 2 is increased. In other words, if the current applied to the charger 2 is fixed, and if the target of the photosensitive member surface potentail is fixed, it is desired to decrease the amount of the pre-exposure with the increase of the wavelength of the light for the pre-exposure.

Further experiments have been conducted to investigate the influence, to the ghost prevention effects, of the mixture of the long wavelength light and short wavelength light. For this purpose, the apparatus shown in FIG. 4 was used, and the mixture of the light emitting diode having the principal wavelength of 700 nm and the light emitting diode having the principal wavelength of 550 nm is disposed at the position indicated by the reference numeral 6. The ratio between the light amounts of the light emitting diodes was changed.

Figure 6:
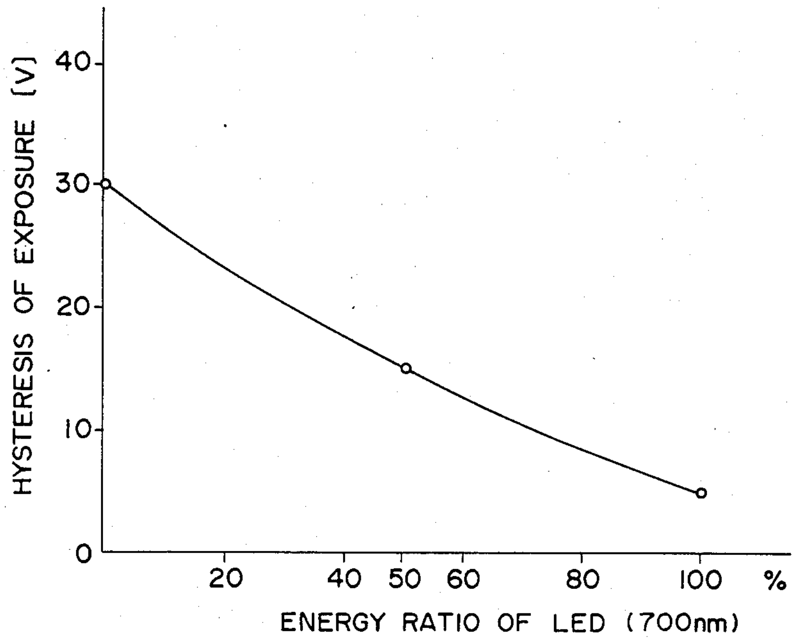
FIG. 6 illustrates the exposure hysteresis when a different light emitting diode is used.

FIG. 6 shows the results which illustrate that, if more than approximately 50% of the light amount of the light emitting diode having the principal wavelength of 700 nm (energy ratio) is contained, the exposure hysteresis is not more than 15 V, which is practically no problem.

Next, the influence of the position of the pre-exposure was investigated. For this purpose, the pre-exposure has been effected in the positions A, B, C and D in FIG. 4. As for the light source, the light emitting diode having the principal wavelength of 700 nm was used.

Figure 7:
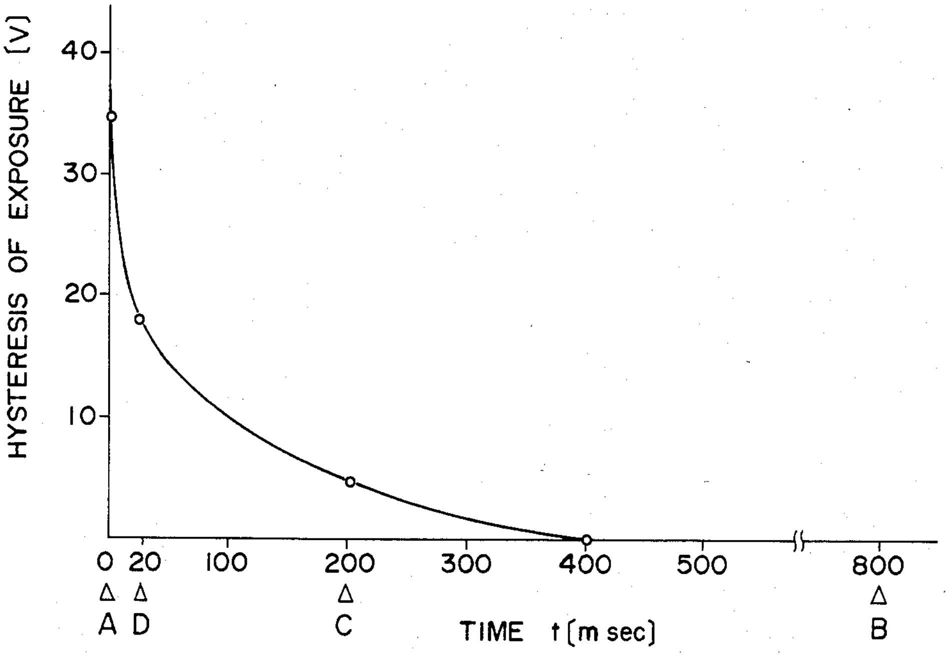
FIG. 7 illustrates the relation between the pre-exposure position and the exposure hysteresis.

FIG. 7 shows the results, wherein the abcissa represents the time required for the photosensitive member 1 to advance from each of the points to the point A; and the ordinate represents the exposure hysteresis amount. To the charger 2, the current of 500 $\mu$A was applied. The light amount from the light emitting diode is so controlled that the surface of the photosensitive member 1 is charged up to +400 V by the first rotation thereof.

When the pre-exposure is performed at the point A where the charger 2 starts its charging operation, the decrease of the dark resistance of the photosensitive member 1 is large at the position of the charger 2, with the result of a very small amount of pre-exposure required in order to charge the surface of the photosensitive member 1 to +400 V. It follows that the amount of exposure hysteresis increases. On the contrary, with the increased distance of the pre-exposure position away from the point A, the amount of the pre-exposure can be increased so that the exposure hysteresis can be reduced. It has been found that the curve (FIG. 7) is steep within the range of approximately 20 ms from the point A, and therefore, it is preferable not to pre-expose the photosensitive member within this range. In other words, the pre-exposure is preferably implemented at the position away from the point A by the time distance not less than 20 ms in the direction opposite to the rotation of the photosensitive member 1. More preferably, the position away from the point A by not less than 200 ms in such a opposite direction is selected, since the curve is significantly less steep as shown in FIG. 7.

Figure 8:
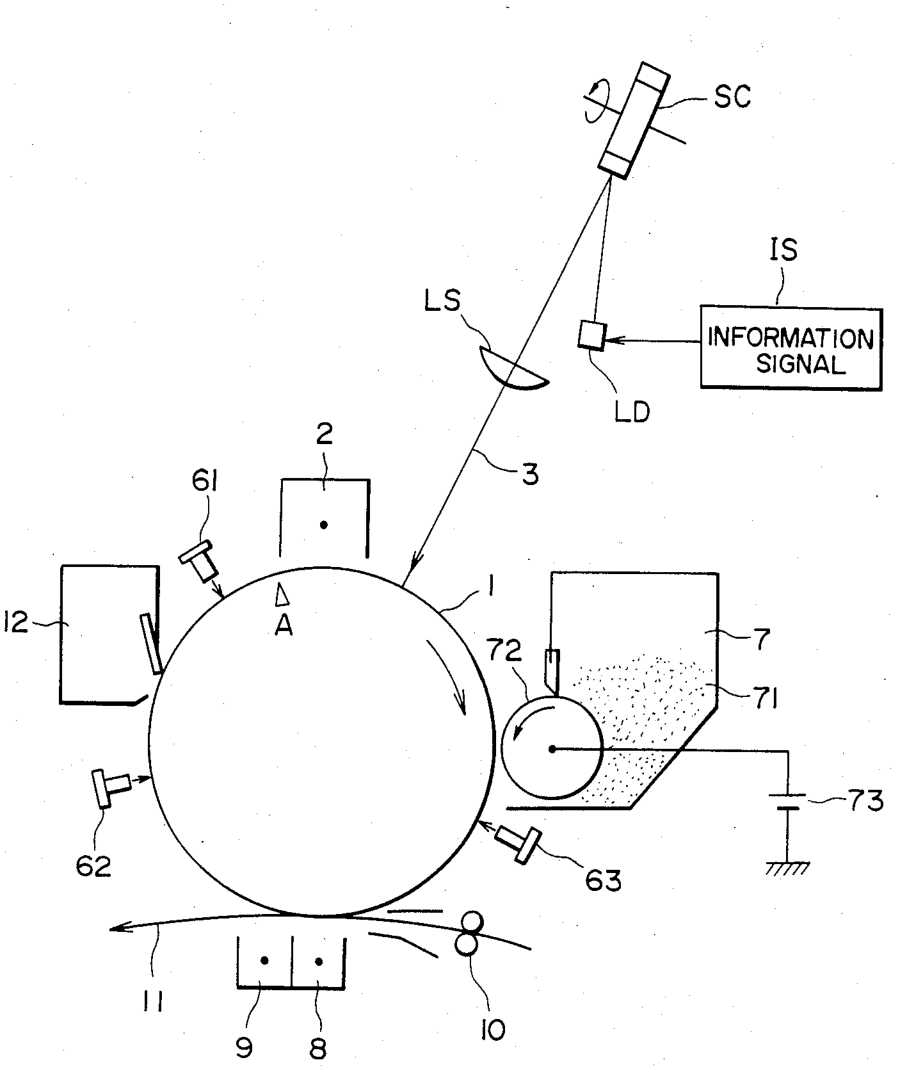
FIG. 8 is a cross-sectional view of an apparatus according to an embodiment of the present invention.

FIG. 8 is a cross-sectional view of an apparatus according to an embodiment of the present invention. The amorhous silicon photosensitive member 1 rotates in the direction shown by an arrow. It is first charged uniformly by the charger 2. After the charging, it is exposed to the laser beam 3 which is modulated in accordance with the information to be recorded. By this exposure, an electrostatic latent image is formed on the amorphous silicon photosensitive member 1.

As for the semiconductor laser LD for emitting the laser beam 3, the laser is used which produces the beam having the wavelength which is longer than 700 nm. More particularly, in the present invention, near-infrared semiconductor laser LD producing the beam having the wavelength ranging from 760 nm to 800 nm, may be used without occurrence of ghost images. The semiconductor laser LD is driven in response to the signals produced by the record information signal source IS, such as a computer and an original reading device for reading an original to be recorded and transducing the reading to electric signals corresponding thereto by a solid state image sensor (e.g. CCD). The laser beam 3 is deflected by a scanner SC to scan the photosensitive member 1 in the direction substantially perpendicular to the rotation thereof. The laser beam 3 is focused as a spot on the photosensitive member 1 by a lens LS.

The electrostatic latent image formed in the manner described above is developed by developing means 7, which is effective to deposit developer particles (toner 71) to such light potential portions, i.e., the portions of the photosensitive member which have been exposed to the laser beam 3. Therefore, the toner 71 is substantially not deposited to the dark potential portions, i.e. the portions which have not been exposed to the laser beam 3. To achieve this, the toner 71 is charged to the same polarity as the charging polarity of the charger 2; and to a roller 72 which functions to carry the toner 71 toward the photosensitive member 1, a bias voltage is applied by the power source 73, which bias voltage is between the dark potential and the light potential.

The toner image thus formed on the photosensitive member 1 is transferred by the transfer charger 8 to a transfer material 11 which is transported by a roller 10. The charging polarity of the transfer charger 8 is the opposite to the polarity of the toner 71.

Then, the transfer material 11 is subjected to a separation charger 9 which is effective to remove from the transfer material 11 the charge given by the transfer charger 8 to facilitate the separation of the transfer material 11 from the photosensitive member 1. The transfer material 11 separated from the photosensitive member 1 is transported to an image fixing device (not shown) which may be of a conventional type, whereat the image is fixed. On the other hand, the toner remaining on the photosensitive member 1 after the image transfer to the transfer material 11, is removed from the photosensitive member 1 by cleaning means 12.

The apparatus is provided with the light emitting diodes 61, 62 and 63 which produce the light having the principal wavelength (peak wavelength) longer than 600 nm, more preferably longer than 650 nm. The light emitting diode 61 irradiates the photosensitive member 1 at such a position that not less than 20 ms is required for the photosensitive member 1 to move from the pre-exposure position to the point A. Additionally, the light emitting diode 61 is disposed downstream of the cleaning means 12, and therefore, it can apply the light to such a portion of the photosensitive member 1 that the residual toner has been removed therefrom. Accordingly, the whole surface of the photosensitive member 1 is pre-exposed substantially uniformly, which is advantageous.

The light emitting diode 62 irradiates the amorphous silicon photosensitive member 1 at a position between the image transfer station and the cleaning station. It is preferable that not less than 200 ms is required for the photosensitive member 1 to move from the light emitting diode 62 position to the point A.

The light emitting diode 63 is located such that it irradiates the amorphous silicon photosensitive member 1 at a position between the developing station and the transfer station. The light emitting diode 53 can be located at such a position that the time period not less than 400 ms is required for the photoensitive member 1 to move from the exposure position to the point A, and therefore, the amorphous silicon photosensitive member 1 can be exposed to a relatively larger amount of light by the light emitting diode 63. This is possible even to such an extent that the exposure amount by the light emitting diode 63 is comparable to that of the laser beam 3. However, in the position of the light emitting diode 63, the photosensitive member can be partly covered by toner particles, where the light irradiation to the photosensitive member is small due to the shading of the toner particles, so that it is desired that a proper amount of exposure is selected. As an example, the light emitting diode producing the light having the principal wavelength of 700 nm is used as the light emitting diode 63, and the current supplied to the light emitting diode is changed. The results are shown in Table 2 below.

TABLE 2

| CURRENT FOR LED 63 (mA) | 1 | 2 | 3 | 4 | 5 |
|---|---|---|---|---|---|
| GHOST | POSITIVE GHOST | NO | NO | REVERSED GHOST | REVERSED GHOST |

As will be understood from Table 2, when the light amount by the light emitting diode 63 is too large, a reversed ghost takes place, which is a phenomenon that the portion exposed to the laser beam 3 appears, in the next image, as a void, that is, no toner is deposited at the portion which must have the toner. When, on the contrary, the exposure amount by the light emitting diode 63 is too small, the positive, that is, usual ghost results. It is preferable that the amount of exposure is determined so as to avoid both of those ghost images.

An additional advantageous effect has been found that the separation of the transfer material 11 from the photosensitive member 1 is made easier by the pre-exposure prior to the transfer station. It is considered that this is because the electric charge on the photosensitive member 1 is uniformly removed.

Figure 9:
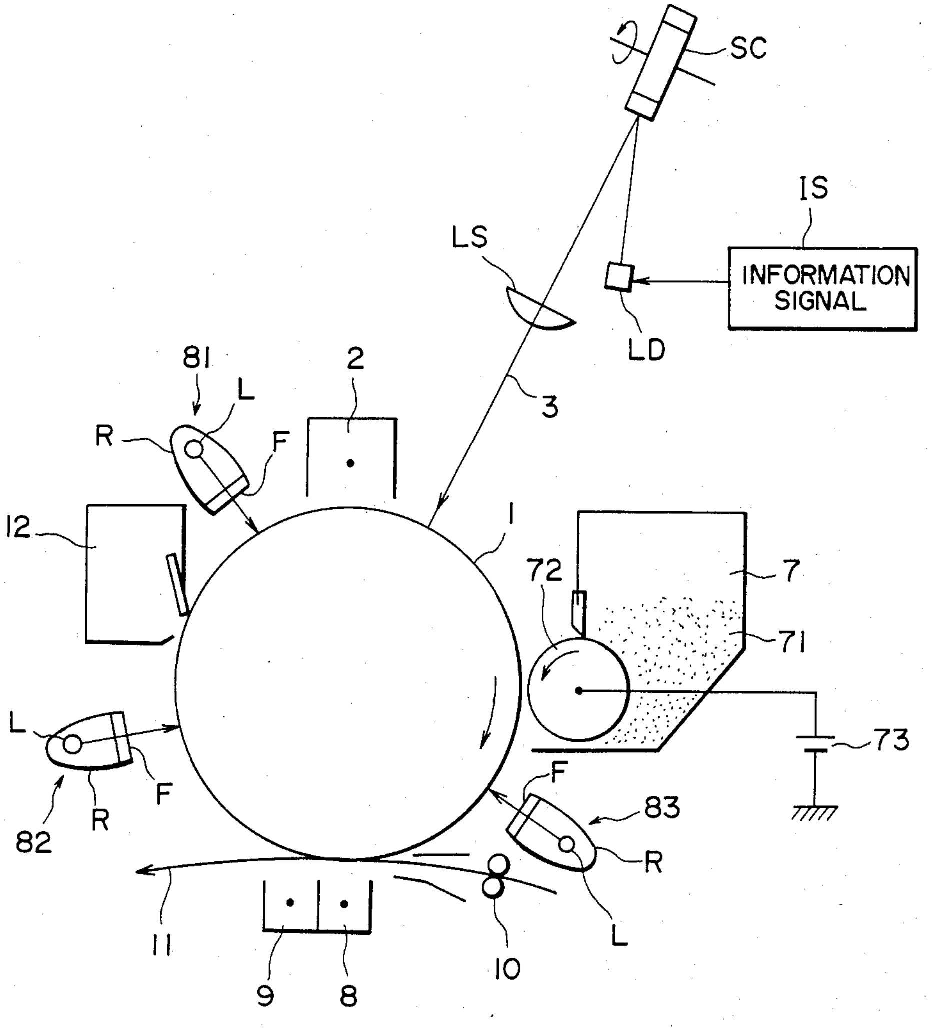
FIG. 9 is a cross-sectional view of an apparatus according to another embodiment of the present invention.

The advantageous effects of the present invention are provided when one of the light emitting diodes 61, 62 and 63 is used. However, two or three of them may be used. For example, when the light emitting diodes 61 and 62 are used, the amount of exposure by the light emitting diode 61 may be $\frac{1}{2}$-1/10 of that by the light emitting diode 62. In any way, the light emitting diode is preferable as the light source for the pre-exposure, because it is small in size and also small in the width of the spectral distribution. FIG. 9 is a cross-sectional view of an apparatus according to another embodiment of the present invention. Since this embodiment is similar to the foregoing embodiment, except for the portions which will be described, the detailed description of the similar portions is omitted for the sake of simplicity by assigning the same reference numerals to the elements having corresponding functions. In this embodiment, exposure means 81, 82 and 83 each having a tungsten lamp are used in place of the light emitting diodes 61, 62 and 63. Each of the exposure means 81, 82 and 83 is provided with a filter F to subtantially block the component of the light emitted by the tungsten lamp which has the wavelength shorter than 600 nm and pass the component thereof having the spectral distribution whose peak wavelength is not less than 600 nm. Thus, the amorphous silicon photosensitive member 1 is exposed to the latter component. In the embodiment of FIG. 9, it is preferable that the filter F has such a spectral transmittance property that the amorphous silicon photosensitive member 1 is exposed to the light having the spectral distribution, in which the peak wavelength is longer than 650 nm.

As for the light for the pre-exposure, the light having the spectral distribution whose peak wavelength is shorter than 800 nm. This is because the amorphous silicon photosensitive member still exhibits non-negligible sensitivity to the light having the wavelength of 800 nm, and because it is close enough to the wavelength of the beam emitted by a semiconductor laser. However, the light having the spectral distribution whose peak wavelength is longer than 800 nm may be used for the pre-exposure, if it is a long wavelength beam to which the amorphous silicon photosensitive member is sensitive.

While the invention has been described with reference to the structures disclosed herein, it is not confined to the details set forth and this application is intended to cover such modifications or changes as may come within the purposes of the improvements or the scope of the following claims.

What is claimed is:

1. An electrophotographic apparatus, comprising:

an electrophotographic photosensitive member including as a main component amorphous silicon, the photosensitive member being circularly movable by a first station, a second station and a third station repetitively in the order named;

charging means, provided at the first station, for charging said photosensitive member;

first exposure means, provided at the second station, for exposing said photosensitive member to a semiconductor laser beam of wavelength longer than 700 nm, which is modulated in accordance with information to be recorded on the photosensitive member; and a second exposure means, provided at the third station, for exposing said photosensitive member to light having a peak of a spectral distribution at a wavelength longer than 600 nm.

2. An apparatus according to claim 1, wherein said second exposure means includes, as a light source, a light emitting diode having a peak of an emitting spectral distribution at a wavelength longer than 600 nm.

3. An apparatus according to claim 1, wherein said second exposure means includes, as a light source, a tungsten lamp and includes a filter for substantially blocking a component of light from the tungsten lamp which has a wavelength shorter than 600 nm.

4. An apparatus according to claim 1, 2 or 3, wherein a developing station is disposed between the second station and the third station, and wherein the developing station includes developing means for depositing a developer to a portion of said photosensitive member which has been exposed to said semiconductor laser beam.

5. An apparatus according to claim 4, wherein an image transfer station for transferring a developer image formed on said photosensitive member onto a transfer material, is disposed between said developing station and the third station, and further comprising a cleaning station for removing residual developer remaining on said photosensitive member after the image has been transferred by said transferring station.

6. An apparatus according to claim 4, wherein an image transfer station for transferring a developer image formed on said photosensitive member onto a transfer material, is disposed between the third station and the first station, and further comprising a cleaning station for removing residual developer remaining on said photosensitive member after the image has been transferred by said transfer station.

7. An apparatus according to claim 4, wherein an image transfer station for transferring a developer image formed on said photosensitive member onto a transfer material, is disposed between the developing station and the third station, and wherein a cleaning station for removing residual developer remaining on said photosensitive member, is disposed between the third station and the first station.

8. An apparatus according to claim 1, 2 or 3, wherein the time required for said photosensitive member to advance from the third station to the first station, is longer than 20 ms.

9. An apparatus according to claim 1, wherein said second exposure means is effective to expose said photosensitive member to light having a peak of a spectral distribution at a wavelength longer than 650 nm.

10. An apparatus according to claim 1, wherein said second exposure means exposes said photosensitive member to light having a peak of a spectral distribution at a wavelength shorter than 800 nm.

11. An electrophotographic apparatus comprising:

an electrophotographic photosensitive member including as a main component amorphous silicon, the photosensitive member being rotatable by a first station, a second station, a third station and a fourth station repetitively in the order named;

charging means, provided at the first station, for charging said photosensitive member;

first exposure means, provided at the second station, for exposing said photosensitive member to semiconductor laser beam of having the wavelength longer than 700 nm, which is modulated in accordance with information to be recorded on said photosensitive member;

developing means, provided at the third station, for depositing a developer to a portion of said photosensitive member which has been exposed to said semiconductor laser beam;

a second exposure means, provided at the fourth station, for exposing said photosensitive member to light having a peak of spectral distribution at a wavelength longer than 600 nm, said second exposure means including, as a light source, a light emitting diode member having a peak of an emitting spectral distribution at a wavelength longer than 600 nm.

12. An apparatus according to claim 11, wherein an image transfer station for transferring a developer image formed on said photosensitive member onto a transfer material, is disposed between the third station and the fourth station.

13. An apparatus according to claim 12, wherein a cleaning station for removing residual developer remaining on said photosensitive member after the image has been transferred by said transferring station, is disposed between said image transfer station and the fourth station.

14. An apparatus according to claim 11, wherein an image transfer station for transferring a developer image formed on said photosensitive member onto a transfer material, is disposed between the fourth station and the first station.

15. An apparatus according to claim 11, wherein an image transfer station for transferring a developer image formed on said photosensitive member onto a transfer material, is disposed between the third station and the fourth station, and wherein a cleaning station for removing residual developer remaining on said photosensitive member, is disposed between the fourth station and the first station.

16. An apparatus according to claim 11, wherein the time required for said photosensitive member to advance from the first station to the fourth station is longer than 20 ms.

17. An apparatus according to claim 11, wherein said light emitting diode member has a peak of an emitting spectral distribution at a wavelength not less than 650 nm.

18. An apparatus according to claim 11, wherein said light emitting member has a peak of an emitting spectral distribution at a wavelength shorter than 800 nm.

19. An electrophotographic apparatus comprising:

an electrophotographic photosensitive member including as a main component amorphous silicon, the photosensitive member being rotatable by a first station, a second station, a third station and a fourth station repetitively in the order named;

charging means, provided at the first station, for charging said photosensitive member;

first exposure means, provided at the second station, for exposing said photosensitive member to a semiconductor laser beam having the wavelength longer than 700 nm, which is modulated in accordance with information to be recorded on said photosensitive member;

developing means, provided at the third station, for depositing a developer to a portion of said photosensitive member which has been exposed to said semiconductor laser beam; and a second exposure means, provided at the fourth station, for exposing said photosensitive member to light having a peak of spectral distribution at a wavelength longer than 600 nm, said second exposure means including, as a light source, a tungsten lamp and a filter for substantially blocking a component of light from the tungsten lamp which has a wavelength shorter than 600 nm.

20. An apparatus according to claim 19, wherein an image transfer station for transferring a developer image formed on said photosensitive member onto a transfer material, is disposed between the third station and the fourth station.

21. An apparatus according to claim 20, wherein a cleaning station for removing residual developer remaining on said photosensitive member after the image has been transferred by said transferring station, is disposed between said transfer station and the fourth station.

22. An apparatus according to claim 19, wherein an image transfer station for transferring a developer image formed on said photosensitive member onto a transfer material, is disposed between the fourth station and the first station.

23. An apparatus according to claim 19, wherein an image transfer station for transferring a developer image formed on said photosensitive member onto a transfer material, is disposed between the third station and the fourth station, and wherein a cleaning station for removing residual developer remaining on said photosensitive member, is disposed between the fourth station and the first station.

24. An apparatus according to claim 19, wherein the time required for said photosensitive member to advance from the fourth station to the fourth station is longer than 20 ms.

25. An apparatus according to claim 19, wherein said second exposure means is effective to expose said photosensitive member to light having a peak of a spectral distribution at a wavelength longer than 650 nm.

26. An apparatus according to claim 19, wherein said second exposure means exposes said photosensitive member to light having a peak of a spectral distribution at a wavelength shorter than 800 nm.

* * * * *